United States Patent [19]

Saint-Prix

[11] 4,161,414

[45] Jul. 17, 1979

[54] PROCESS FOR FABRICATING FLUID-CONTROL MEMBERS FOR INTERNAL-COMBUSTION ENGINES AND THE LIKE

[76] Inventor: Robert Saint-Prix, 14 Rue Edouard Petit, St. Etienne (Loire), France

[21] Appl. No.: 930,818

[22] Filed: Aug. 3, 1978

Related U.S. Application Data

[63] Continuation-in-part of Ser. No. 767,663, Feb. 10, 1977, abandoned.

[51] Int. Cl.² ............................................. C22F 1/10
[52] U.S. Cl. ......................... 148/11.5 R; 148/11.5 N; 148/11.5 Q; 148/39; 148/127
[58] Field of Search ...................... 148/11.5 R, 11.5 N, 148/127, 39, 11.5 Q

[56] References Cited

U.S. PATENT DOCUMENTS

| | | | |
|---|---|---|---|
| 2,246,078 | 6/1941 | Rohn et al. | 148/11.5 N |
| 2,734,008 | 2/1956 | Kirkpatrick et al. | 148/11.5 N |
| 3,461,001 | 8/1969 | Kubera | 148/11.5 R |

Primary Examiner—W. Stallard
Attorney, Agent, or Firm—Karl F. Ross

[57] ABSTRACT

A stem valve for an internal-combustion engine, especially one burning heavy oil, has a body composed of a first nonferrous alloy with an annular seat-engaging zone into which a second nonferrous alloy has been diffused to form a third alloy in situ. The first alloy contains about 30% chromium and about 60% nickel with practically no cobalt, whereas the second alloy contains about 50% cobalt, 30% chromium and lesser amounts of other metals but no nickel. The resulting third alloy, whose composition is made more or less uniform throughout the interdiffusion zone by thermal and mechanical processing, contains substantially equal proportions of nickel and chromium on the order of 30% each.

9 Claims, 10 Drawing Figures

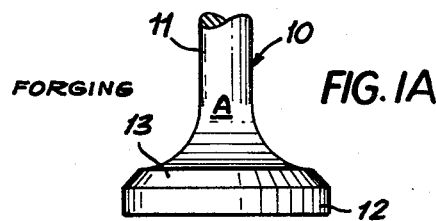
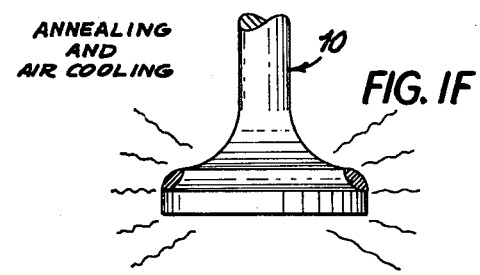
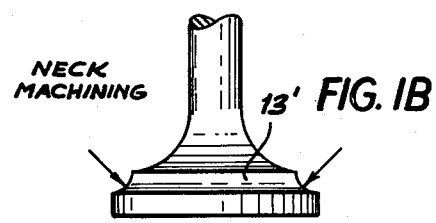
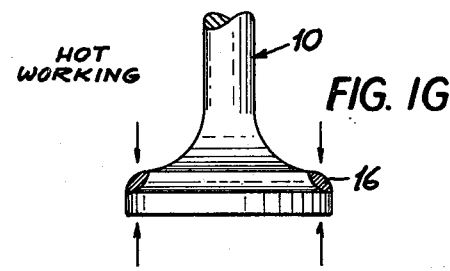
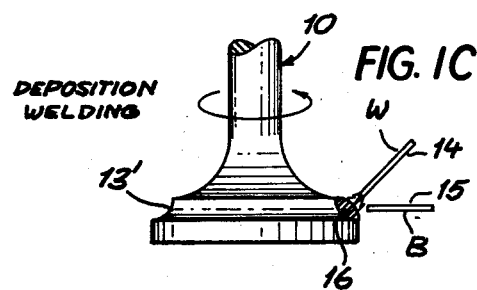
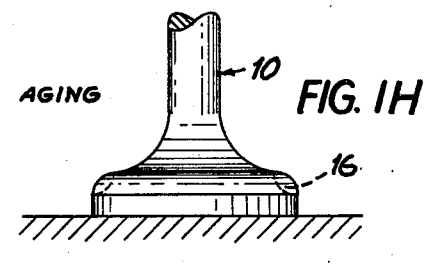
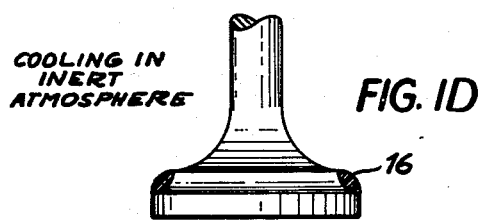
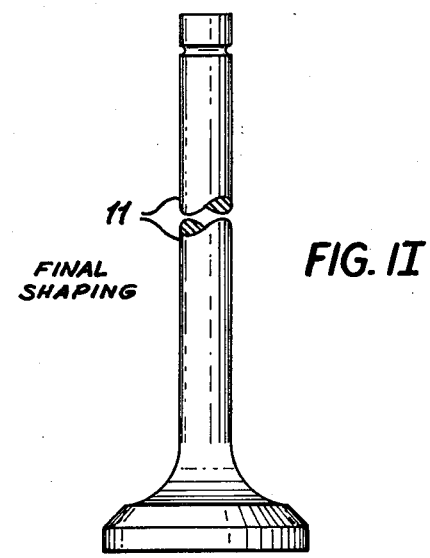
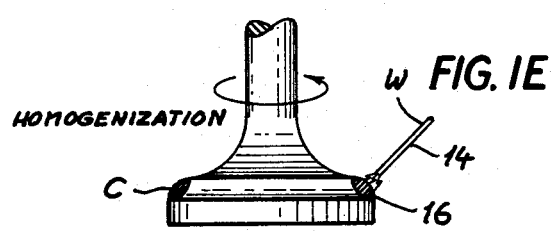

PROCESS FOR FABRICATING FLUID-CONTROL MEMBERS FOR INTERNAL-COMBUSTION ENGINES AND THE LIKE

CROSS-REFERENCE TO RELATED APPLICATION

This is a continuation-in-part of my copending application Ser. No. 767,663 filed Feb. 10, 1977.

FIELD OF THE INVENTION

My present invention relates to the manufacture of fluid-control members coacting with a seat in a hot, corrosive environment, e.g. stem valves for internal-combustion engines burning heavy oils which contain significant impurities such as sulphur, vanadium and sodium tending to form highly corrosive compounds at the elevated operating temperatures of such engines. This type of engine is usually employed in seagoing craft.

BACKGROUND OF THE INVENTION

The usual operating temperatures in marine-type engines are on the order of 650° C. Thus, their valves not only have to resist corrosion but also must have sufficient mechanical strength in a heated state to withstand the recurrent impacts to which their heads are subjected when striking the associated valve seats. Stainless and refractory steels do not have the necessary corrosion resistance. Nickel/chromium alloys, especially those with a low carbon content, are more suitable. In the commercially available alloys of this nature, the nickel/chromium ratio generally ranges between about 4:1 and 2:1. Other metallic constituents such as niobium, tungsten and titanium have some anticorrosive effects but do not contribute significantly to the hardness of the alloy at high temperatures.

I have found that a nonferrous alloy containing substantially equal proportions of nickel and chromium, on the order of 30% (by weight) each, are particularly satisfactory from both the mechanical and the chemical viewpoint as discussed above. Such alloys, however, do not readily lend themselves to a forging operation to form a workpiece which can be machined to the requisite shape and dimensions.

OBJECT OF THE INVENTION

It is, therefore, the object of my present invention to provide a process for manufacturing a stem valve or similar fluid-control member that satisfies the aforestated requirements of corrosion resistance and hardness at high temperatures by having a seat-engaging zone made from a nonferrous alloy which contains approximately 30% of nickel and 30% of chromium.

SUMMARY OF THE INVENTION

I realize this object, in conformity with my present invention, by forming a workpiece from a first corrosion-resistant alloy (A), essentially composed of nonferrous metals including a preponderance of nickel and a lesser proportion of chromium, and applying to a seat-engaging zone of this workpiece a second corrosion-resistant alloy (B) of nonferrous metals containing a predominant proportion of cobalt along with enough chromium to substantially equalize the excess of nickel over chromium in the first alloy. The application of the second alloy to the valve body is carried out at a temperature high enough to cause interdiffusion of the constituents of the two alloys with resulting formation of a third alloy (C) having the desired composition specified above. After a period of slow cooling, the workpiece is subjected to a homogenizing heat treatment preferably directed particularly at the interdiffusion zone. That zone is then subjected to mechanical working, advantageously at an elevated temperature less than the solution temperature of the third alloy (C), for the purpose of reducing its granulometry and hardening its structure.

Surprisingly enough, the composition of the resulting third alloy (C) remains more or less uniform throughout the interdiffusion zone which may be of appreciable depth, upward of one millimeter. This uniformity may be further enhanced by an aging process after the hot working. The two latter steps advantageously takes place at a temperature ranging between substantially 600° and 700° C., preferably at the latter level.

According to a particular advantageous feature of my invention, the application of the second alloy (B) to the seat-engaging zone of the workpiece (referred to hereinafter, for convenience, as a valve body) is carried out by deposition welding at a temperature between substantially 2500° and 3500° C., preferably around 3000° C. The homogenizing heat treatment may be performed in a similar manner, i.e. with the aid of an electric arc, but without the addition of further alloying material "B".

The thermomechanical aftertreatment may also include an annealing step, at a temperature on the order of 1050° C., followed by air cooling in advance of the hot-working operation. This annealing step has the effect of reducing or eliminating an intergranular precipitation otherwise observed in the substrate, i.e. in the alloy "A" forming the valve body.

BRIEF DESCRIPTION OF THE DRAWING

The above and other features of my invention will now be described in detail with reference to the accompanying drawing in which:

FIGS. 1A–1I are a set of elevational views (partly in section) illustrating successive steps in the manufacture of a stem valve pursuant to my invention.

SPECIFIC DESCRIPTION

Figure 2:
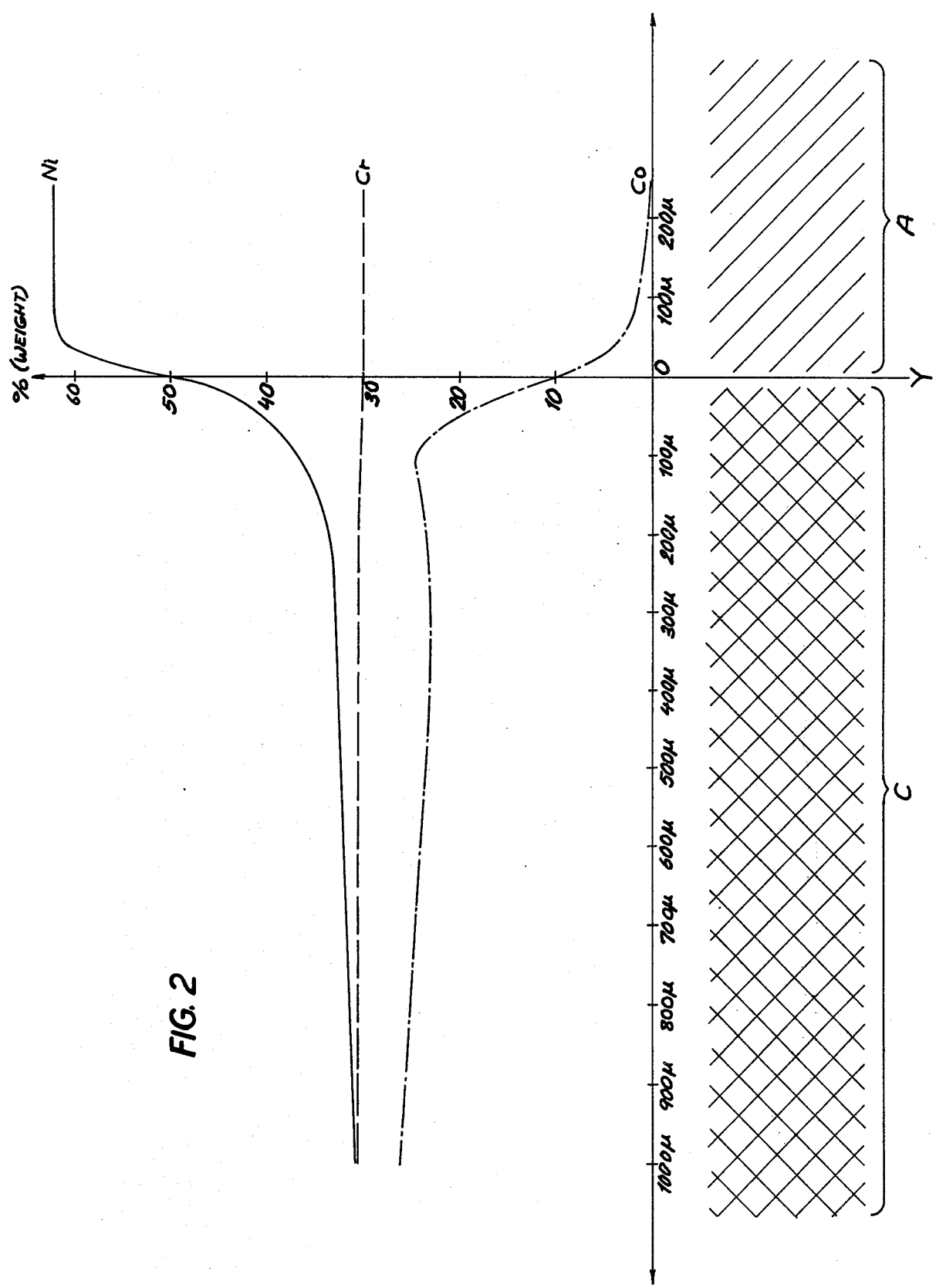
FIG. 2 is a graph showing the distribution of the major alloying metals in the vicinity of the seat-engaging portion of the valve.

FIG. 1A shows part of a workpiece 10 produced by forging from a suitable blank, consisting of an alloy A more fully described hereinafter, to form the body of a valve having a stem 11 and a head 12. A neck portion 13 adjoining this head coacts with a conventional valve seat in a cylinder of an internal-combustion engine to control the admission of fuel or the discharge of exhaust gases. This neck portion 13, accordingly, is the most highly stressed part of the valve and must be able to withstand chemical attacks as well as mechanical shocks in a hot, corrosive environment.

FIG. 1B shows a preparatory step in the formation of a reinforcement for a seat-engaging zone designed to satisfy these requirements, namely the machining of a groove 13' in the neck portion 12. This step is followed, according to FIG. 1C, by the application of an alloy B to the grooved neck portion 13' by electric-arc welding in a protective atmosphere, preferably argon; the nature of alloy B will be described below. A tungsten electrode 14 coacts with the valve body 10 as it slowly rotates about its axis to produce a deposit of alloy B, supplied in the form of a rod 15, in the shape of an annular bead 16. This deposition welding takes place in a single pass, i.e. during one revolution of the valve body. The radial thickness of the deposit 16 may range between 1 and 3 mm, e.g. 2 mm for a neck diameter of 100 mm or 2.5 mm for a neck diameter of 165 mm.

The welding temperature is preferably around 3000° C., with an arc length (i.e. distance of rod 15 from the valve body) of 20 mm. The peripheral velocity of the valve body at its neck groove 13' may range between about 2 and 12 mm per second, a preferred relative speed being 6 mm/sec.

Next, as illustrated in FIG. 1D, the coated valve body is allowed to cool to approximately ambient temperature in an inert atmosphere, e.g. argon. Thereafter it is subjected to a thermal homogenization treatment by an operation similar to the deposition welding of FIG. 1C, except for the absence of supply rod 15 so that no additional alloy B is deposited.

Such a localized reheating of the deposit 16 promotes the interdiffusion of alloys A and B to form an alloy C which is more or less homogeneous throughout virtually the entire zone 16. To eliminate any residual inhomogeneity, the workpiece is then subjected to an annealing treatment according to FIG. 1F, at a temperature of about 1050° C. and for a period of 1.5 minutes, followed by air cooling to ambient temperature. This annealing step dissolves some of the carbides that have accumulated in the intergranular interstices of the substrate A, thereby preventing internal corrosion which could arise from a concentration of such carbides in the interfacial region.

Thereafter, the workpiece 10 is subjeced to hot working at a temperature between 600° and 700° C., preferably closer to the latter limit, as schematically indicated in FIG. 1G. This treatment raises the hardness of the interdiffusion zone 16 to a range between about 500 and 750 $H_y$.

A final aftertreatment, illustrated in FIG. 1H, involves the aging of a valve body 10 at an elevated temperature, e.g. of 620° C., for an extended period of about 15 to 30 hours. This temperature is about equal to or slightly higher than that to which the valve will be subjected in use. The aging operation results in further hardening and also brings about a coalescence of residual carbides.

The valve body so treated can now be subjected to final machining as illustrated in FIG. 1I.

A representative composition of alloy A, marketed under the name NIMONIC 80 EA 3 by the French firm of Aubert et Duval, is as follows (all percentages by weight):

TABLE A

| nickel | 62% |
|---|---|
| chromium | 30% |
| cobalt | up to 2% |
| titanium | 1.8% |
| iron | 1% |
| aluminum | 0.9% |
| carbon | up to 0.5% | plus fractional percentages of other metallic and nonmetallic elements.

A representative composition of alloy B, marketed by the same French firm under the name ALACRITE 52 T, is as follows (percentages again by weight):

TABLE B

| cobalt | 50% |
|---|---|
| chromium | 32% |
| tungsten | 14% |
| niobium | 2% |
| carbon | up to 1% | plus fractional percentages of other metallic and nonmetallic elements.

The resulting alloy C has an average composition which, in an ideal case, is the mean of the compositions of its constituent alloys A and B. Thus, the proportion by weight of the principal ingredients of alloy C will be roughly as follows:

TABLE C

| nickel | 31% |
|---|---|
| chromium | 31% |
| cobalt | 26% |
| tungsten | 7% |
| niobium | 1% |
| carbon | up to 0.5% |

FIG. 2 shows several curves representing the distribution of the three major constituents, i.e. nickel, chromium and cobalt, on both sides of a boundary Y which marks the interface between the substrate A and the reinforcing alloy C on the treated valve body of FIGS. 1H and 1I. The proportions of these metals to the right of boundary Y, thus within the valve body proper, substantially corresponds to those given in Table A. To the left of this boundary, the proportions deviate but slightly from the theoretical values given in Table C; it will be noted that the latter composition is nearly constant over a depth of 1000$\mu$.

The following tests were carried out to determine the properties of valve bodies made in conformity with my present invention as well as others in which some of the aforedescribed steps were omitted. These properties are summarized hereinafter in Table D.

EXAMPLE I

Two series of samples Ia and Ib were made of alloy A, both produced by rough forging (cf. FIG. 1A) at 1050° C. from a cylindrical blank. Each sample was then subjected to a finish-forging operation, i.e. a hot-working step according to FIG. 1G, at a temperature of 700° C. The samples of series Ib were thereafter aged, in accordance with FIG. 1H, for 16 hours at the same temperature.

EXAMPLE II

Six series of samples IIa–IIf were produced, starting with the rough forging of a workpiece from a blank of alloy A in the same manner as in Example I. Samples IIa, IIb, IIe and IIf also underwent a semifinish forging at the same temperature of 1050° C.

After cooling, samples IIa were subjected to all the steps described with reference to FIGS. 1B–1G, except for the annealing operation of FIG. 1F. Samples IIb were treated in the same manner as samples IIa and were then further subjected to the aging step of FIG. 1H. In the case of samples IIc, finish forging (i.e. hot working) was carried out immediately after the rough-forging operation and was followed, after intermediate cooling, by the machining, deposition and cooling steps of FIGS. 1B, 1C and 1D without any further treatment. Samples IId, after intermediate cooling following rough forging, underwent the same steps as samples IIc and were also subjected to aging as per FIG. 1H but with omission of the several cooling steps and the homogenization and aging treatments of FIGS. 1E and 1H. Samples IIf, otherwise treated like samples IIe, also underwent this aging step.

The samples were tested for hardness by the usual Vickers method. These tests, though carried out at ambient temperatures, also provided a basis for evaluating the relative strengths exhibited by these materials when heated under actual working conditions.

The samples were further subjected to corrosion tests by being immersed in a pulverulent mixture composed of sodium sulphate and sodium metavanadate in a molar proportion of 14:86. The receptacle containing the sample covered by the eutectic mixture was placed in a furnace and maintained for two hours at a constant temperature of 650° C. All the samples were found to be perfectly resistant to this corrosive mixture throughout the test period.

A more intense corrosion test was then carried out by replacing the aforedescribed mixture with pure vanadium pentoxide $V_2O_5$ and raising the temperature to 900° C.

TABLE D

|  | Ia | Ib | IIa | IIb | IIc | IId | IIe | IIf |
|---|---|---|---|---|---|---|---|---|
| MANUFACTURING STEPS | | | | | | | | |
| Rough forging at 1050° C. | X | X | X | X | X | X | X | X |
| Semifinish forging at 1050° C | O | O | X | X | O | O | X | X |
| Finish forging at 1050° C. | O | O | O | O | X | O | O | O |
| Cooling | O | O | X | X | X | X | O | O |
| Neck machining | O | O | X | X | X | X | X | X |
| Deposition of alloy B | O | O | X | X | X | X | X | X |
| Slow cooling | O | O | X | X | X | X | O | O |
| Homogenization | O | O | X | X | O | O | O | O |
| Finish forging at 700° (working) | X | X | X | X | O | O | X | X |
| Aging at 700° C. (16 hours) | O | X | O | X | O | X | O | X |
| Mean hardness (at ambient temperature) in $H_v$ measured at the seat-engaging surface | 450 | 480 | 525 | 560 | 320 | 345 | 510 | 570 |
| Corrosion tests (two hours in pure $V_2O_5$ at 900°) | free from corrosion | | | | highly corroded | | moderate corrosion | |

The foregoing Table clearly shows the superiority of samples IIa and IIb, from the combined viewpoints of corrosion resistance and hardness, in comparison with all the other samples. The omission of the aging step in samples IIa manifests itself in a certain hardness difference.

Table D does not reflect the significance of the annealing step according to FIG. 1F whose long-term beneficial effects do not become apparent in tests of this nature.

Naturally, the process according to my invention is not limited to the manufacture of stem or poppet valves but could be utilized in the production of similar fluid-control members, e.g. dampers or flap valves, exposed to comparable thermal and mechanical stresses.

I claim:

1. A process for manufacturing a fluid-control member coacting with a seat in a hot, corrosive environment, comprising the steps of:
   (a) forming a workpiece from a corrosion-resistant first alloy essentially composed of nonferrous metals including a preponderance of nickel and a lesser proportion of chromium;
   (b) applying to a seat-engaging zone of said workpiece a second corrosion-resistant alloy of nonferrous metals containing a predominant proportion of cobalt along with enough chromium to substantially equalize the excess of nickel over chromium in said first alloy, the application of said second alloy to said zone being carried out at a temperature high enough to cause interdiffusion of the constituents of said first and second alloys with resulting formation of a third alloy in said zone containing substantially equal proportions of nickel and chromium on the order of 30% each;
   (c) slowly cooling said workpiece;
   (d) subjecting the cooled workpiece to a homogenizing heat treatment; and
   (e) mechanically working said zone to effect a reduction in the granulometry thereof and a hardening of its structure.

2. The process defined in claim 1 wherein said first alloy contains, by weight, substantially 30% chromium and 62% nickel, said second alloy consisting essentially of about 50% cobalt, about 32% chromium, about 14% tungsten, about 2% niobium and about 1% carbon.

3. The process defined in claim 1 or 2, further comprising the step of aging the workpiece after the working thereof by subjecting it to a temperature between substantially 600° and 700° C. for an extended period.

4. The process defined in claim 1 or 2 wherein the mechanical working is carried out at an elevated temperature less than the solution temperature of said third alloy.

5. The process defined in claim 4 wherein said elevated temperature ranges between substantially 600° and 700° C.

6. The process defined in claim 1 or 2 wherein the application of said second alloy in step (b) is by deposition welding.

7. The process defined in claim 6 wherein the deposition welding is carried out at a temperature between substantially 2500° and 3500° C., with relative rotation of said workpiece and a supply of said second alloy at a speed ranging between substantially 2 and 12 mm per second at said seat-engaging zone.

8. The process defined in claim 7 wherein said homogenizing heat treatment involves a localized heating of said seat-engaging zone by an electric arc, moving along said zone at a relative speed ranging between substantially 2 and 12 mm per second, to a temperature between substantially 2500° and 3500° C.

9. The process defined in clause 8, further comprising the step of annealing said workpiece after said homogenizing heat treatment at a temperature on the order of 1050° C., followed by air cooling prior to the working in step (e).

* * * * *